3,811,989
DECORATIVE TRIM STRIPS
Robert Renner Hearn, Woking, England, assignor to Creators Limited, Surrey, England
Filed May 15, 1972, Ser. No. 253,406
Int. Cl. B32b 3/02, 15/08, 31/30
U.S. Cl. 161—5      3 Claims

ABSTRACT OF THE DISCLOSURE

This invention relates to decorative trim strips having a surface displaying a metallized finish and which comprise a substrate extruded of a heat-resistant plastics material to the front face of which is bonded a metal or metallized strip to provide the metallized finish. A protective layer of clear plastics material may cover the metal or metallized strip. The invention also provides processes of making these strips.

---

Figure 1:
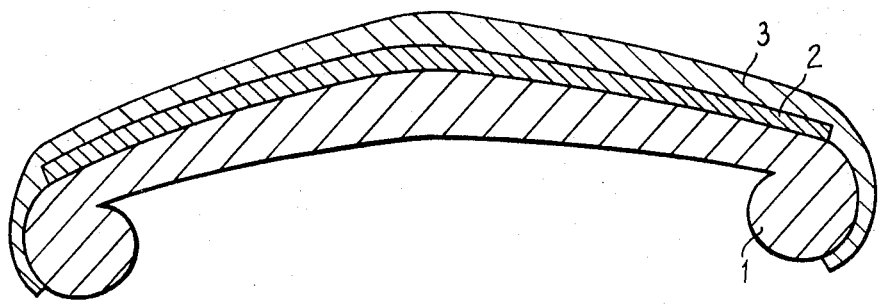

The present invention relates to a decorative trim strip comprising a plastics extrusion having a surface displaying a metallized finish, and which is suitable for embellishment of the exterior of a motor car body. The face of the strip displaying the metallized finish is herein referred to as the "front face."

The present invention consists in a decorative trim strip comprising a substrate of any desired cross-section, which is extruded from a heat-resistant plastics material, i.e. a plastics material possessing relatively high resistance to deformation under heat (temperatures of about 100° C. or more), such as acrylonitrile-butadiene-styrene (ABS), chlorinated polyvinylchloride (CPVC), nylon or polypropylene, to the front face of which is bonded a metal or metallized strip to provide the metallized finish on the front face. The strip may be a metal foil, such as aluminium foil, bonded to the substrate by adhesive or it may comprise a metallized plastics film, which is bonded to the substrate by adhesive or heat and pressure. The metal layer may be formed on the plastics film by spraying or vacuum depositing a metal coating, for example, of aluminium, onto the surface of a transparent or translucent plastics film, preferably a polyester film such as "Mylar" (Registered Trademark) or "Melinex" (Registered Trademark). The metal layer may be laminated between two strips of plastics film so that both surfaces of the metal layer are enclosed. The metallized strip may conveniently be constructed as described in U.S. application Ser. No. 845,155, filed July 28, 1969 of Cecil Kent, now U.S. Pat. No. 3,681,180, that is to say it may comprise a strip of transparent or translucent polyester film having one surface metallized and having its metallized surface laminated to a thin backing layer of polyvinylchloride, and a second strip of transparent or translucent polyvinylchloride film, which is wider than the polyester strip, laminated to the unmetallized surface of the polyester film with its marginal edge zones protruding beyond the edges of the polyester strip.

To protect the metallized finish of the strip, a layer of clear PVC or other thermoplastics material may be applied over the front face of the trim strip, this layer being clear to enable the metallized finish to be seen. The protective layer may incorporate a U.V. absorber, also to protect the "Mylar" from attack by U.V. light.

One process of making a decorative trim strip according to the invention is by laminating a metallized plastics strip, such as a strip of metallized "Mylar" film having a backing of PVC foil laminated thereto, to an extruded substrate of ABS or CPVC by pressure as the substrate is extruded. The film may be heated prior to being pressed against the hot extrudate. The protective layer, when provided, can be applied as a calendered film and bonded to the front face by adhesive or heat welding, or it may be extruded directly onto or around the front face of the strip, and if necessary the bonding may be assisted by pressure.

According to another process, a metal strip or metallized plastics strip is laminated to the front face of a substrate, e.g. of ABS or CPVC, using an adhesive. The metal surface may be protected with a clear PVC or other thermoplastics layer as in the preceding process.

According to a further process, a metal strip or metallized plastics strip is fed through an extrusion die through which two plastics materials are extruded to form the substrate and protective layer respectively, whereby the strip constitutes an insert embedded or encapsulated in the extrudate and sandwiched between the substrate and the protective layer. The metal or metallized plastics strip may be coated on one or both faces with a heat-sensitive or pressure-sensitive adhesive compatible with the adjacent plastics material prior to being fed through the die or a strip or strips of the adhesive may be fed through the die with the metal or metallized strip.

Two embodiments of decorative trim strip of this invention are illustrated in the accompanying drawing, both figures of which show cross-sections.

Referring to FIG. 1, 1 is the extruded substrate of heat-resistant plastics material, such as ABS, CPVC, nylon or polypropylene. 2 may be a metal foil adhesively bonded to the front face of the substrate or it may be an aluminized film of clear PVC, "Melinex" or "Mylar," preferably backed with a layer of PVC film, bonded to the front face of the substrate 1 by a suitable adhesive or by heat and pressure. The strip 2 may be constructed as described in the aforesaid application Ser. No. 845,155, now U.S. Pat. No. 3,681,180. Disposed over the front face of the composite strip and embracing the sides of the substrate is a protective layer 3 of clear PVC or cellulose-acetate-butyrate (CAB). In the embodiment shown, the rear of the substrate is shaped so that it can be snapped over clips, buttons or equivalent fixing means secured to a vehicle body.

Figure 2:
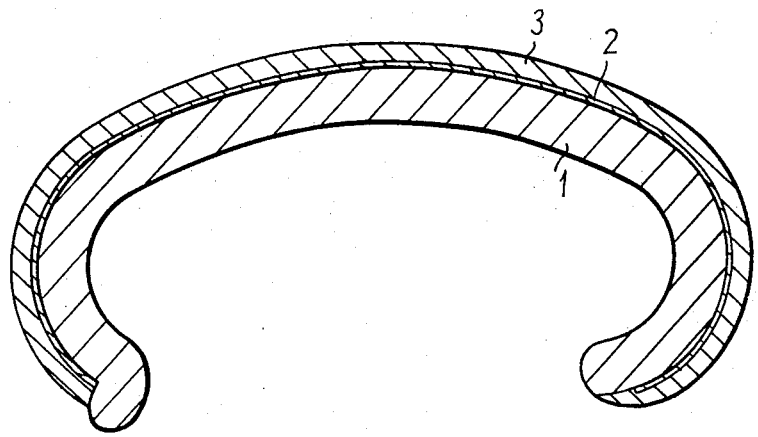

Other shapes would be used depending upon the form of fixing and the position where the decorative trim strip is to be fixed. One such other shape is shown in FIG. 2 in which like parts bear the same reference numerals as in FIG. 1.

The strips shown in the drawing have a channel-shaped cross-section and are provided with inwardly directed edge portions for engaging behind the clips, buttons or other fixing means to hold the strip in position on a vehicle body or other article to which it is to be fixed. The front faces of the strips shown extend rearwardly towards the edges of the strip. Thus the front face of the strip shown in FIG. 1 has a shallow V-shaped profile whilst that shown in FIG. 2 as an arcuate profile. The edge portions of the strips may comprise undercut beads as shown in FIG. 1 or, as shown in FIG. 2, may merge smoothly with the remainder of the strip to form a strip of generally C-shaped cross-section. One (as shown) or both of the edges of the substrate of the C-shaped strip of FIG. 2 may be thickened for reinforcement.

The trim strip of the present invention is suitable for use as an external trim on a vehicle body and may be affixed thereon by clips or the like disposed at spaced intervals along the trim or by clipping it over a flange such as the flange which usually extends along the side of the passenger compartment roof of an automobile and defines a gutter. Previously manufactured decorative plastics trim strips have not proved satisfactory for such application as they deform under the heat (of about 100° C. or more) to which trim strips are submitted when a finished vehicle body has to be passed through the paint retouch oven.

Whilst particular embodiments have been described, it will be understood that various modifications can be made without departing from the scope of the invention as defined in the appended claims. For example a C-shaped strip such as is shown in FIG. 2 may be provided with an inwardly directed bead along one or both edges of the substrate.

I claim:

1. A decorative trim strip comprising a substrate consisting of an extrusion of a plastics material possessing relatively high resistance to deformation under heat selected from the group consisting of acrylonitrile-butadiene-styrene, chlorinated polyvinylchloride, nylon and polypropylene, which is channel-shaped in cross-section and provided with inwardly directed edge portions for engaging behind clips, buttons or other fixing means to hold the strip in position on a vehicle body or other article to which it is to be fixed, to the front face of which is bonded a metal layer.

2. A decorative trim strip as claimed in claim 1, having a protective layer of clear plastics material overlying and bonded to the front face of the metal layer.

3. A decorative trim strip as claimed in claim 1, which is generally C-shaped in cross-section and comprises an extruded substrate of acrylonitrile-butadiene-styrene, a strip of metal foil bonded to the front face of said substrate and a protective layer of a material selected from the group consisting of transparent or translucent polyvinylchloride and cellulose-acetate-butyrate overlying and bonded to the front face of metal foil.

References Cited
UNITED STATES PATENTS

| Patent No. | Date | Name | Class |
|---|---|---|---|
| 3,440,129 | 4/1969 | Anselm | 161—5 |
| 3,681,180 | 8/1972 | Kent | 161—102 X |
| 3,594,264 | 7/1971 | Urban | 161—183 X |
| 3,694,131 | 9/1972 | Stuart | 264—271 X |
| 2,714,571 | 8/1955 | Irion et al. | 156—244 |
| 3,590,768 | 7/1971 | Shanok et al. | 161—5 X |
| 3,630,809 | 12/1971 | Edwards | 161—408 X |
| 3,687,794 | 8/1972 | Shanok et al. | 161—5 |
| 3,720,567 | 3/1973 | Shanok et al. | 161—5 |
| 3,745,056 | 7/1973 | Jackson | 161—149 |
| 3,755,052 | 8/1973 | Dressler | 161—4 |

HAROLD ANSHER, Primary Examiner

U.S. Cl. X.R.

156—244; 161—6, 125, 149; 264—177 R, 271